(12) United States Patent
Palladino

(10) Patent No.: US 7,165,657 B2
(45) Date of Patent: Jan. 23, 2007

(54) THIN FILM SENSOR FOR BRAKE LINING PAD WEAR AND BRAKE TEMPERATURE SENSING

(75) Inventor: James Palladino, Winona Lake, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/963,398

(22) Filed: Oct. 11, 2004

(65) Prior Publication Data

US 2006/0076196 A1 Apr. 13, 2006

(51) Int. Cl.
*F16D 66/02* (2006.01)

(52) U.S. Cl. .............. 188/1.11 L; 188/1.11 E; 73/129; 340/454

(58) Field of Classification Search ........... 188/1.11 L, 188/1.11 E, 1.11 R, 1.11 W; 116/208; 340/454, 340/453; 192/30 W; 73/129, 121; 374/141; 303/20
See application file for complete search history.

(56) References Cited

U.S. PATENT DOCUMENTS

| | | | |
|---|---|---|---|
| 3,015,950 A | * | 1/1962 | Doctor et al. .................. 73/86 |
| 4,824,260 A | | 4/1989 | Novotny et al. |
| 5,637,794 A | | 6/1997 | Hanisko |
| 6,095,289 A | * | 8/2000 | Ray et al. ............... 188/1.11 E |
| 6,250,430 B1 | | 6/2001 | Kyrtsos |
| 6,302,241 B1 | | 10/2001 | Gronowicz, Jr. |
| 6,350,430 B1 | | 2/2002 | Dooley et al. |
| 6,360,850 B1 | | 3/2002 | Odisho et al. |
| 6,450,300 B1 | | 9/2002 | Kramer |
| 6,477,893 B1 | * | 11/2002 | Djordjevic ................... 73/129 |
| 6,512,453 B1 | | 1/2003 | Leiber et al. |
| 6,564,909 B1 | | 5/2003 | Razzano |

* cited by examiner

Primary Examiner—Thomas Williams
(74) Attorney, Agent, or Firm—Jeffrey P. Calfa; Gerald W. Askew; Susan L. Lukasik

(57) ABSTRACT

A modular electrical resistance sensor is positionable in gaps between brake linings for a drum brake. The modular sensor is worn with the brake linings resulting in steadily increasing electrical resistance of the modular sensor. A measurement circuit associated with the modular sensor is programmed to equate electrical resistance to the degree of wear when the sensor has assumed a steady state temperature at or near the ambient temperature. Otherwise, particularly during periods of use of the brakes, resistance and the degree of wear last calculated become arguments into a function for determining brake lining temperature.

8 Claims, 5 Drawing Sheets

THIN FILM SENSOR FOR BRAKE LINING PAD WEAR AND BRAKE TEMPERATURE SENSING

BACKGROUND OF THE INVENTION

1. Technical Field

The invention relates to brake lining wear sensing and brake lining transient temperature detection and more particularly to a modular electrical resistance sensor which may be used to implement wear and temperature sensing.

2. Description of the Problem

Effective brakes are essential to safe motorvehicle operation. Contemporary brake systems dissipate vehicle kinetic energy through brake friction pads as heat. These brake pads have a relatively short service life and require regular replacement. Heavy vehicles have historically exhibited problems with brake overheating, especially when the vehicles are descending along long grades. Overheating reduces stopping ability and accelerates brake pad wear.

Inspection of the brake system has traditionally involved disassembly of the wheel mechanism and visual examination of the pads. It has been recognized that it would be desirable to incorporate some kind of sensor into the brake pads that monitor wear of the pads without the need to disassemble the brake system. Were the same sensor used to monitor brake temperature the addition to vehicle complexity would be minimized.

Various brake lining wear detection systems and brake temperature measurement systems are known in the art. One such system for detecting wear provides a modular, progressive brake lining wear sensor. The sensor has a triangular, wedged shaped electrically resistive member disposed between a pair of conductive plates to define a triangular shaped sensor. The sensor is encapsulated within an erodable molding and connected to a sensing circuit by a pair of leads including a ground lead and a resistive lead. The ground lead and resistance lead emerge from the encapsulated sensor for connection to the sensing circuit. The sensor is disposed within the brake lining and is connected to the brake shoe. As the brake lining progressively wears, the triangular wedged shaped resistive member is also progressively worn away thus continuously changing the overall resistance of the sensor. The change in resistance provides for continuous indication of the state of wear of the brake lining.

Another sensor design provides both wear and temperature sensing. Here a plurality of parallel connected resistors are connected to a sensing circuit. A thermistor provides temperature sensing. The resistors and the separate thermistor are mounted, spaced from one another, on a printed circuit board and the entire unit encapsulated within a single molding. The thermistor is connected to a grounded lead as are each of the resistors. A ground lead, a resistance lead and a thermistor lead emerge from the encapsulated module for connection to the sensing circuit. The module is disposed between linings in a drum brake so that the module is worn away with the linings. With progressive wear the resistors (or at least the conductive loops in which individual resistors are connected) are progressively and sequentially worn away, increasing the resistance of the sensor in a series of discrete steps. Three resistors are used to indicate 4 discrete levels of brake lining wear.

SUMMARY OF THE INVENTION

According to the invention there is provided a brake lining temperature and wear measurement system in which a modular electrical resistance sensor is positioned in gaps between brake linings for a drum brake. The modular electrical resistance sensor comprises a thin film of copper or some other electrically conductive material disposed on a wearable substrate. Substrate and film are encapsulated in a thermally stable, wearable thermoplastic. The modular sensor is positioned with the brake linings to wear down with the lining. This results in steadily increasing electrical resistance of the modular sensor correlated with wear of the lining. A measurement circuit associated with the modular sensor is programmed to equate electrical resistance to the degree of wear and operates when the sensor has assumed a steady state temperature at or near ambient temperature. During periods when the brakes are in use, resistance and the degree of wear last calculated become arguments into a function for determining brake lining temperature.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
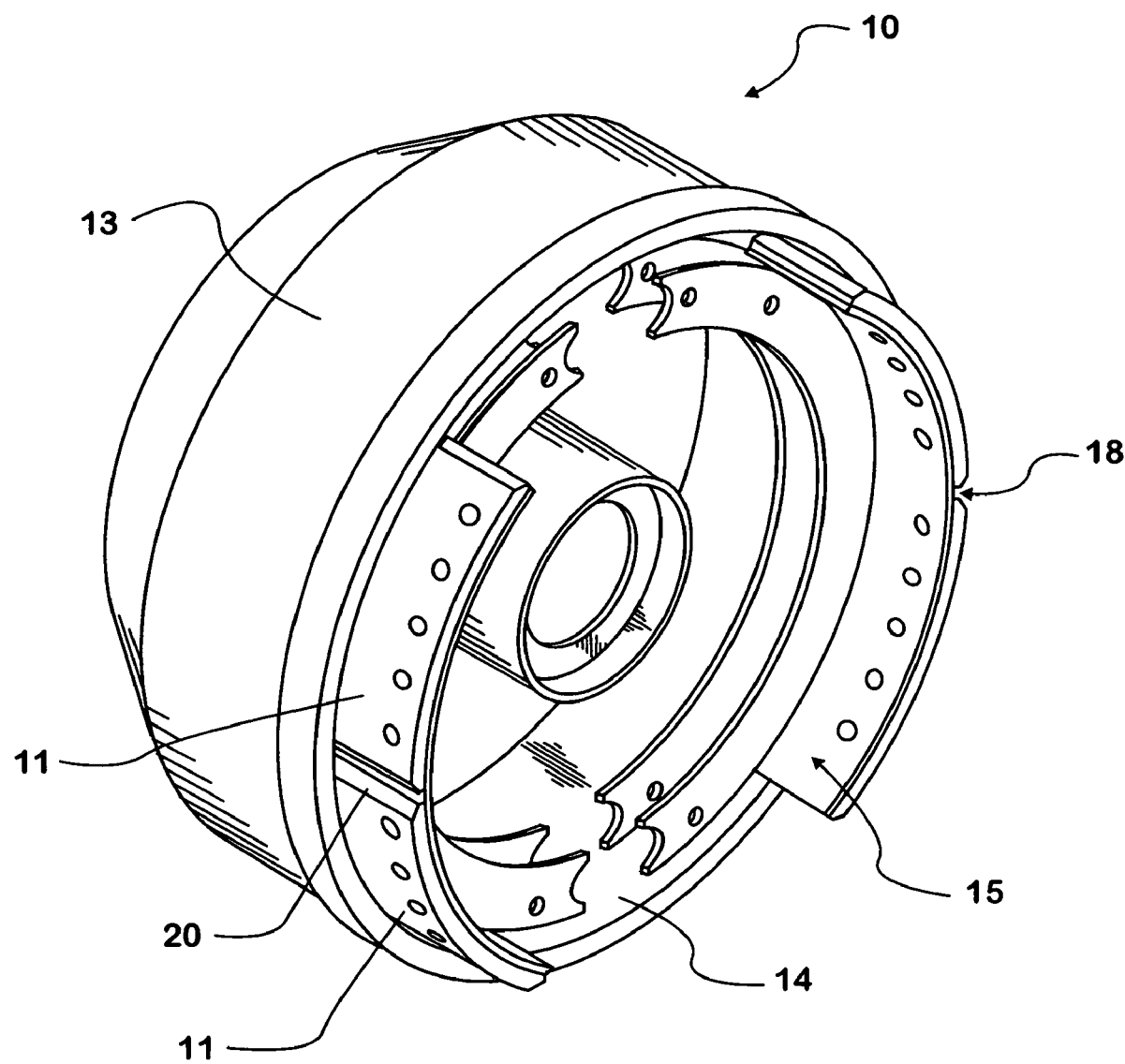
FIG. 1 is a perspective view of a drum brake assembly incorporating the brake wear and temperature sensor of the present invention.

The present invention is preferably employed in a drum brake assembly 10 as shown in FIG. 1. However, the modular sensor 20 may be adopted for employment in other types of brake assemblies. Referring now to FIG. 1, a brake drum 13 has an inner brake surface 14 for frictionally engaging the brake lining 11. An actuator such as an S-cam arrangement displaces the brake shoes 15 outwardly towards the inner brake surface 14 bringing brake lining 11 into contact with the inner brake surface of the drum 13. Brake linings 11 are mounted to the brake shoe 15 to frictionally engage the brake drum 13 and thus provide braking force. The generic brake drum arrangement 10 and actuation mechanism is completely conventional and is well known in the art.

Modular sensor 20 is preferably mounted between a pair of brake lining surfaces 11 in a gap 18 with a distal end substantially flush with the outer or friction surface of the brake lining 11. The specific connection of modular sensor 20 to brake shoe 15 is not shown. The specific manner of connection is not critical to the present invention. Any suitable connection that maintains radial alignment of the modular sensor 20 during braking may be employed.

Figure 2:
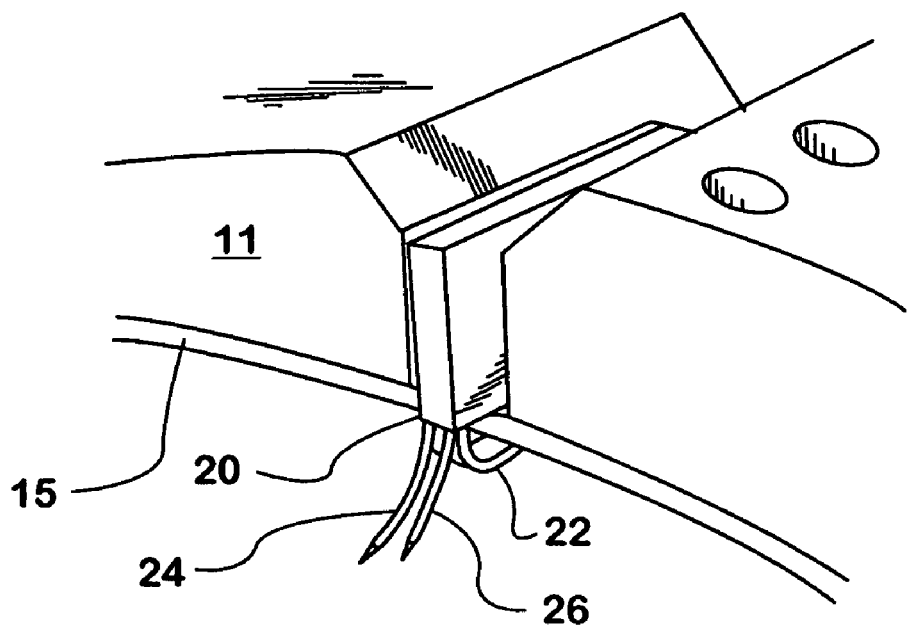
FIG. 2 is a perspective view of a sensor module in accord with the present invention attached to a brake assembly.

FIG. 2 is a perspective view of the preferred embodiment of the present invention prior to any significant wear. Modular sensor 20 is positioned on brake shoe 15 between the brake lining portions 11. A clip 22, having one end partially embedded in the sensor encapsulation, may be used to secure modular sensor 20 to brake shoe 15. Resistance lead 26 and ground lead 24 extend from the encapsulation material of sensor module 20.

Figure 3:
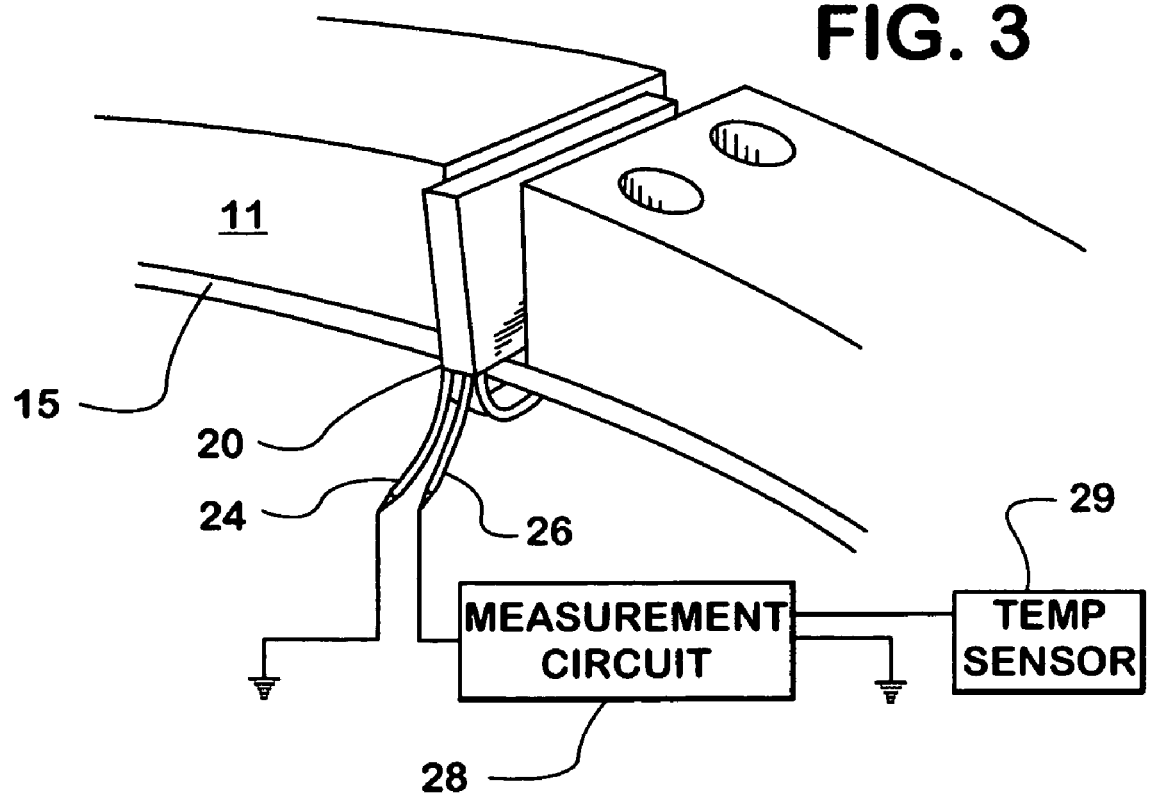
FIG. 3 is a perspective view of a partially worn sensor module from FIG. 2.

FIG. 3 is a perspective view of the modular sensor 20 of FIG. 2 in a partially worn state. Modular sensor 20, including its encapsulating material, the sensor material and sensor backing are all made of erodable material resulting in the sensor wearing to conform substantially to the profile of the brake lining 11 at all times. As more of modular sensor 20 is worn, the resistance of the sensor increases as explained below. Resistance measurements may be equated with either brake lining 11 temperature and brake lining wear, although the measurements cannot be simultaneously equated to both variables. A determination of wear must precede brake lining temperature estimation as explained below. Generally speaking, the progressive increase in resistance indicates the progression of brake lining wear, as determined under conditions of a steady state, and known, brake lining temperature. Resistance lead 26 may be seen connected to a measurement circuit 28, which may be implemented in a number of different ways. Measurement circuit 28 may incorporate an analog to digital converter, a data sending unit, cabling, and a programmable microcomputer attached to receive data over the cabling (not shown). A motor vehicle ambient temperature sensor 29 may be advantageously employed if present to provide ambient temperature readings to the measurement circuit 28. Such elements are believed well within those skilled in the art.

Figure 4:
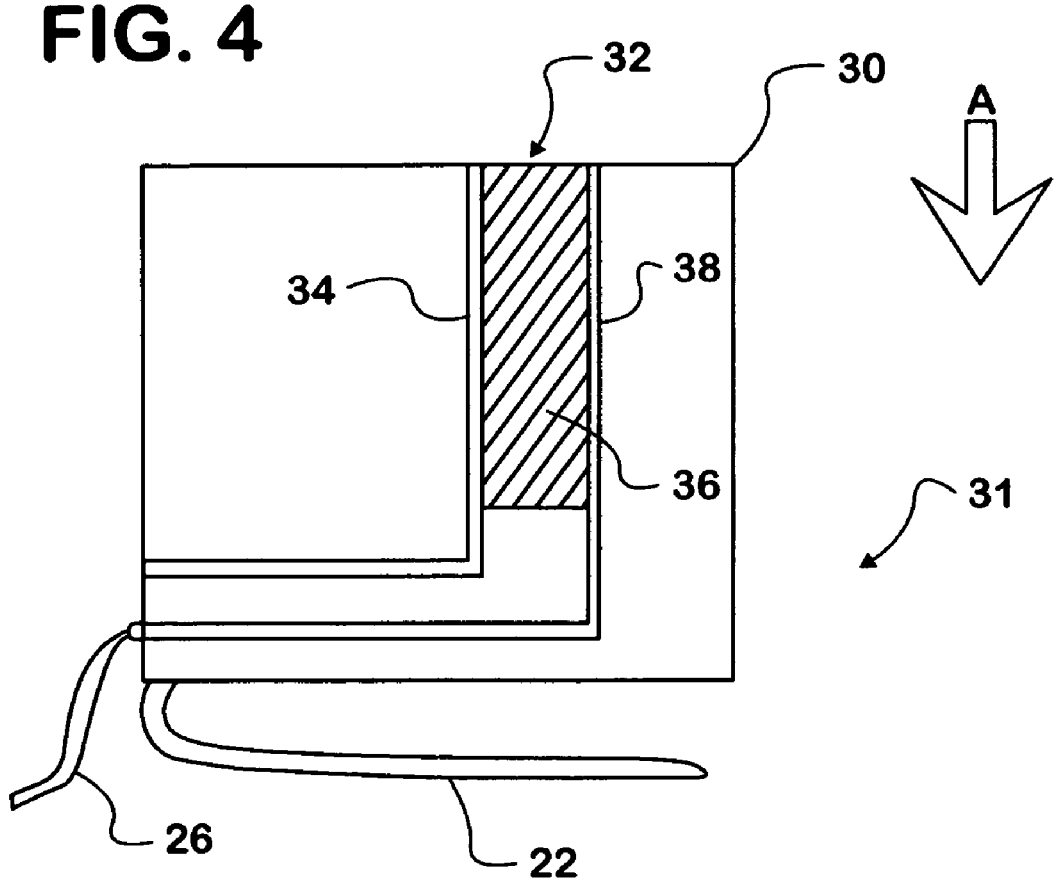
FIG. 4 is a front view of a sensor mounted on a circuit board.
Figure 5:
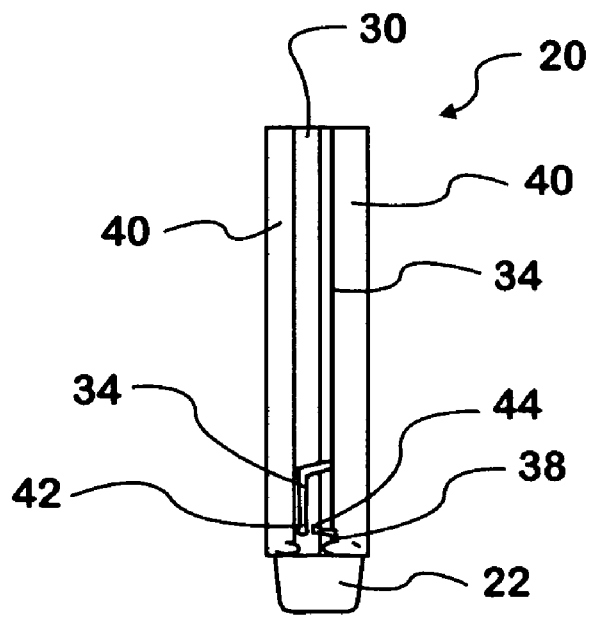
FIG. 5 is a side cross sectional view of the sensor module.

Referring to FIGS. 4 and 5 a sensor 31 suitable for encapsulation to form sensor module 20 is illustrated. Sensor 31 comprises a backing such as a circuit board 30 from one of the major surfaces of which has been etched a copper or metal coated pad 32. Metal coated pad 32 includes rails 34 and 38 and a thin film sheet 36 located between the rails and connected to the rails along two opposed edges. Thin film sheet 36 should be sufficiently Thin relative to the rails 34, 38 to exhibit substantially greater resistivity than the rails. As circuit board 30 is worn down from the top in the direction indicated by the arrow "A", and thin film sheet 36 is worn down along a free edge of the sheet between rails 34 and 38, the area of thin film sheet 36 decreases. A consequent increase in the resistance of sheet 36 between rails 34 and 38 results. Electrical connection to rails 34 and 38 may be made by connection to pads 42 and 44, which are shown op a side of circuit board 30 bordering the etched major face. Alternatively, the leads may be taken off from pads left on the front, etched major face. Both front and back major faces of circuit board 30 are coated with a heat resistant, erodable thermoplastic resin, or similar electrically insulative, heat resistant material.

Figure 6:
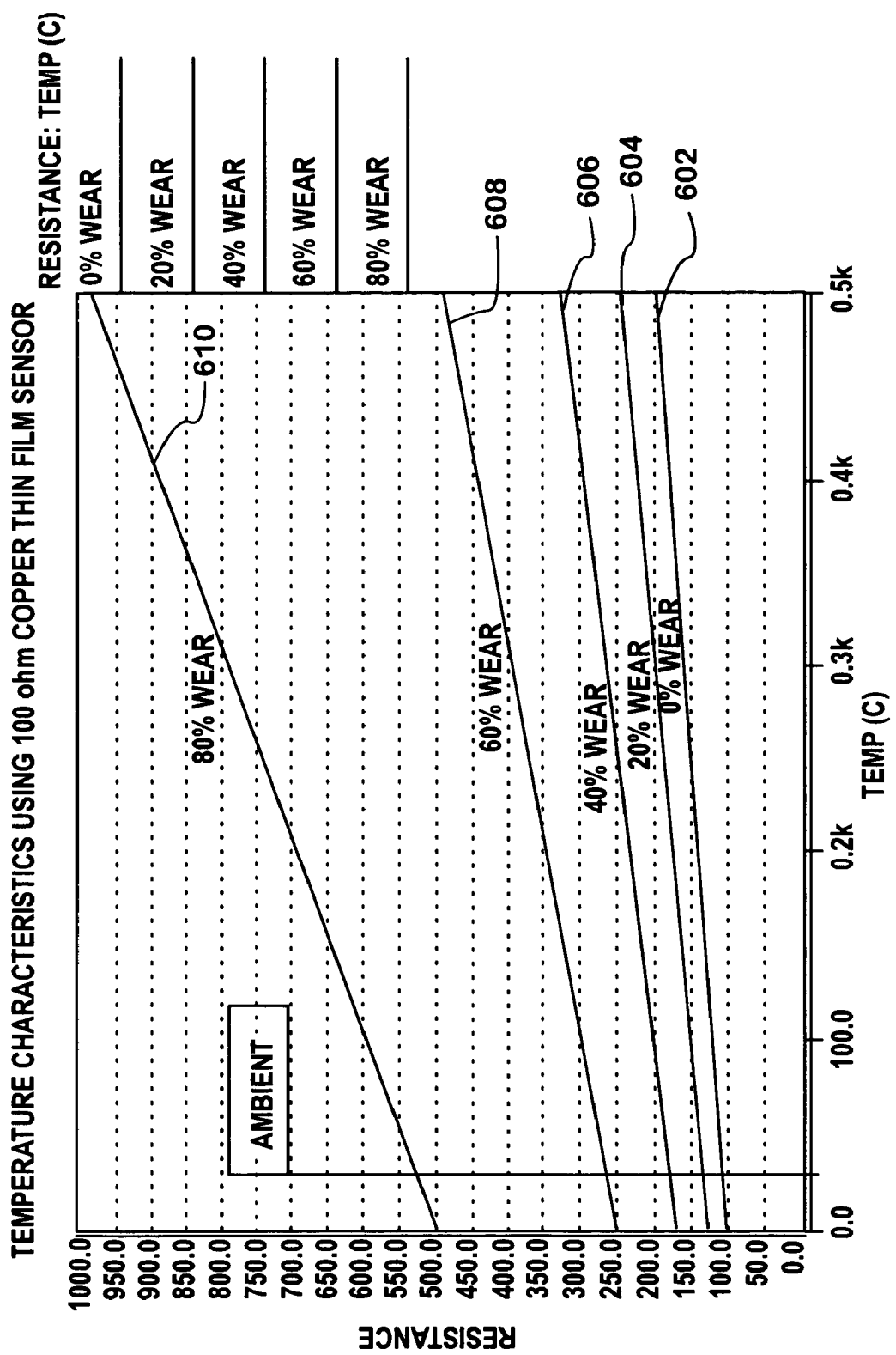
FIG. 6 is a graph illustrating resistance of the sensor against temperature at various degrees of wear of the sensor.

Referring to FIG. 6, graphs of resistance of the metallic thin film 36 against temperature, at various stages of wear (from the top of the sensor module 20 in the direction A), are shown. As is well known, the resistance of copper and most other metals increases linearly with temperature at temperatures typically encountered in motor vehicle operations. The graph illustrates curves 602, 604, 606, 608 and 610 for a sensor which is: wholly intact (0% wear); one fifth eroded (20% wear); two fifths eroded (40% wear); three fifths eroded (60% wear); and four fifths eroded (80% wear). As is readily seen, each resistance curve, for a constant degree of wear, is linear. However, resistance increases exponentially with destruction of the thin film 32 at any temperature and will be understood to increase without bound as the film is destroyed. The operator may choose at any given time to determine one of either the degree of destruction of the film or the temperature of the brakes. Determining brake temperature requires that brake pad wear is already determined. If the operator knows the temperature of the brake linings, wear of the linings can be estimated. If the degree of wear of the linings is known, then temperature of the linings may be estimated. Where a vehicle has stood for a period exceeding a minimum period of time, and the brakes have not been used, it may be assumed that the brakes take on the ambient temperature. This temperature may be measured by an sensor 29 on board the vehicle, such as an engine air intake temperature sensor, or the wear calculation can assume a value, e.g. 25 degrees Celsius, or the ambient temperature may be entered by the vehicle operator. Upon measuring the resistance of the sensor module 20 the measurement circuit 28 can determine which wear curve the point of intersection between resistance and temperature on the graph falls closest to. The selected curve is then be saved as the current wear value. When the vehicle is started and a driver begins to use the brakes, resistance in the film continues to be measured, but the result is mapped to the curve serving as the current estimate of wear to recover brake lining temperature. This may be implemented as a look up table. Thus the curves 602, 604, 606, 608 and 610 are predetermined and may be stored as values in a look up table on a programmable computer.

Figure 7:
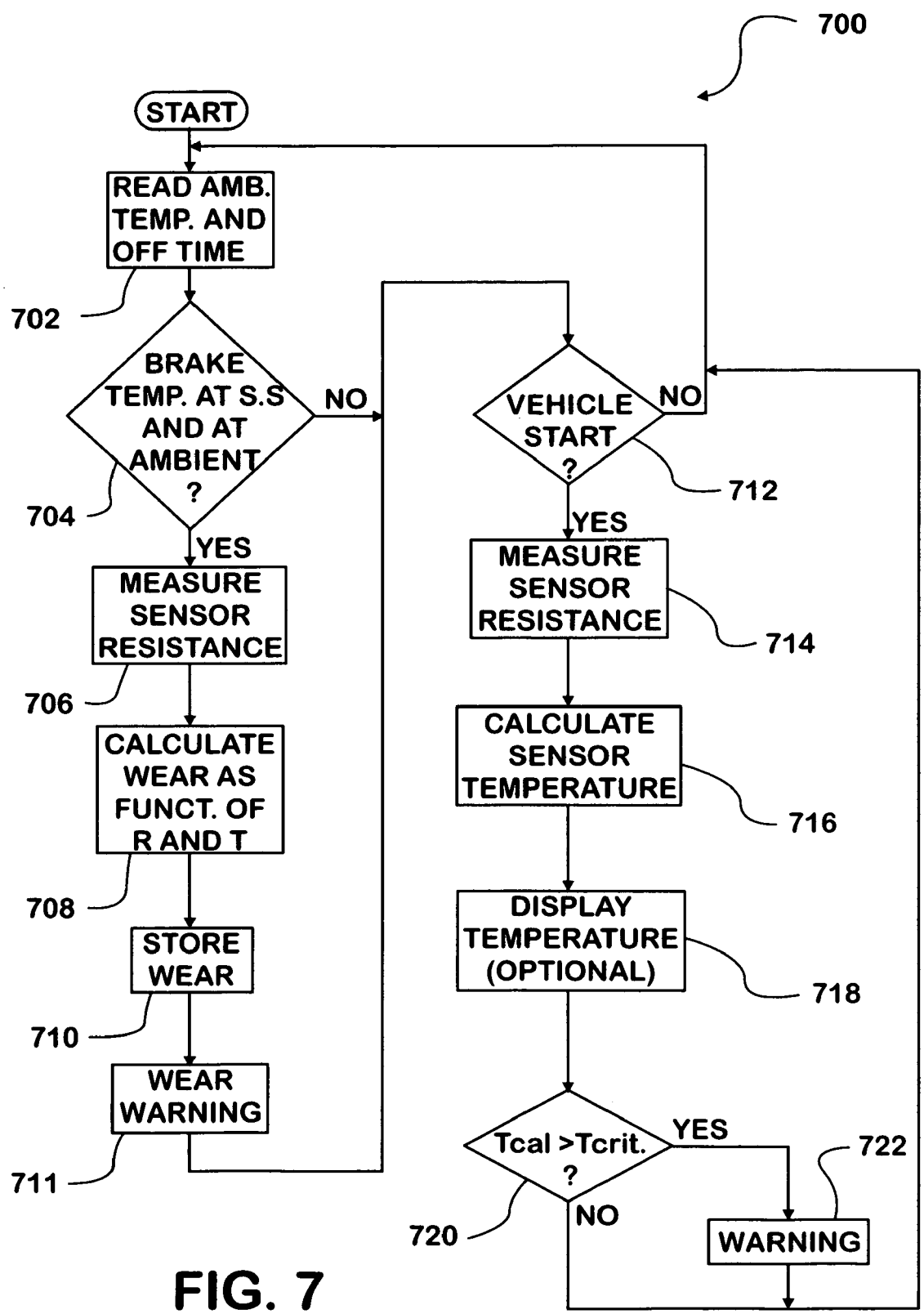
FIG. 7 is a flow chart of a program executed by the measurement circuit for estimating wear and temperature of the brake linings.

Referring to FIG. 7 implementation of the invention is linked to vehicle operation to determine likely periods when the brakes have assumed a steady state temperature close to the ambient temperature. Upon vehicle start step 702 is executed to read the ambient temperature and the length of time that the vehicle has stood. Vehicle start may be any event marking a the end of a period where the vehicle has stood still, with the engine either idling or shut off. Step 704 marks determination as to whether the brake temperature is likely to be at a steady state near the ambient temperature. If the result of the test is in the affirmative, step 706 is executed to measure resistance of the brake lining resistance modules. Once the resistance has been determined step 708 is executed to determine wear of the sensor as a function of temperature and resistance. As noted above, these results may be precalculated and stored as a look up table graphically illustrated in FIG. 6. Step 710 represents selection of a curve (store wear). Wear of course may exceed a limit in which case a brake lining wear warning may be issued (step 711).

Once a new wear level has been determined, or following the NO branch from decision step 704, vehicle start is confirmed at step 712. Confirmation of vehicle start may be taken as an instance of operational application of the brakes. As long as the brakes are not applied the program may continue to loop back to step 702 for a wear measurement. Once the brakes are applied the YES branch is followed from step 712 to step 714, representing another measurement of the resistance of the brake lining resistance sensors. Since the brakes have been used they cannot be assumed to be at ambient temperature any longer, and the measurements are instead used as an argument into the wear curve selected at step 710. Temperature is returned at step 716 and may be displayed to the driver at step 718. The returned temperature is compared to a critical limit temperature at step 720. If the temperature does not exceed limit(s) the program loops back to step 712. If the brake lining temperature exceeds the critical temperature, step 722 is executed to issue a warning and the program loops back to step 712.

The invention provides a low cost mechanism utilizing a single sensor type located in the area of the brakes. The sensor realizes both wear and temperature monitoring for brake linings by utilizing on board computing capacity to monitor the context of the measurements.

While the invention is shown in only one of its forms, it is not thus limited but is susceptible to various changes and modifications without departing from the spirit and scope of the invention.

What is claimed is:

1. A sensor for measuring operating temperature and for use in indicating progressive brake wear of a brake lining, the sensor comprising:
   an erodable substrate having a major surface and an upper edge bordering the major surface with the erodable substrate oriented to bring its upper edge into contact with a brake surface;
   a pair of conductive rails extending along the erodable substrate generally perpendicular to the upper edge of the erodable substrate;
   a thin film of conductive material disposed on the malor surface of the substrate and extending downwardly along the major surface from the upper edge between and in electrical contact with the pair of conductive rails, the thin film being thinner than the pair of conductive rails and exhibiting substantially higher resistivity than the pair of conductive rails; and
   an encapsulant disposed over the major surface including the thin film and the conductive rails.

2. The sensor according to claim 1, wherein the encapsulant enclosed the sensor to form a modular sensor unit.

3. The sensor according to claim 2, further comprising:
   a pair of conductive leads connected to the pair of conductive rails;
   a measurement circuit connected to at least one of the pair of conductive leads for reading resistance of the thin film, the measurement circuit providing means for indicating whether the thin film is at or near ambient temperature, means responsive to an indication that the thin film is at or near ambient temperature for determining degree of wear of a brake lining as a function of resistance of the thin film, and means responsive to determination of a degree of wear of the brake lining and resistance of the thin film for determining temperature of the sensor.

4. A brake system for a motor vehicle comprising:
   a brake drum having an inner surface;
   a brake lining for wearing against the inner surface of the brake drum for braking a motor vehicle;
   a brake actuator for urging the brake lining into contact against the inner surface;
   an electrical resistance sensor mounted on the brake actuator in gaps between the brake lining to exhibit a wear profile conforming to that of the brake lining;
   the electrical resistance sensor having a wearable substrate with a major surface perpendicular to a wearing surface of the brake lining and a erodable edge, a thin film conductive member disposed over a portion off the major surface of the wearable substrate, and a pair of conductive rails disposed on the first major surface defining first and second sides of the thin film conductive member which is thinner than and exhibits substantially greater unit resistance than do the conductive rails, the thin film conductive member and the conductive rails being oriented so that the thin film conductive member is eroded along an edge running between the conductive rails with the thin film conductive member exhibiting increasing resistance as it is worn down and with increasing temperature; and
   a measurement circuit connected to the electrical resistance sensor, the measurement circuit providing means for determining whether the electrical resistance sensor is likely to be at or near ambient temperature, means responsive to determination that the electrical resistance sensor likely to be at or near ambient temperature for determining a degree of wear of the brake lining as a function of resistance of the thin film conductive member, and means responsive to a subsequent measurements of resistance of the thin film conductive member after the vehicle has started and brake lining and brake drum used for slowing a vehicle for determining temperature of the sensor as a function of determined wear and newly measured electrical resistance.

5. A brake system according to claim 4, wherein the substrate, the conductive rails and the thin film are encapsulated in a heat stable thermoplastic to form a sensor module.

6. A brake system according to claim 5, further comprising a vehicle ambient temperature sensor coupled to the measurement circuit.

7. A brake lining wear and temperature measurement system comprising:
   an electrically resistive element disposed in proximity to the brake lining, the electrically resistive element comprising an erodable sensor module fitted between a gap in the brake lining with a resistive lead and a ground lead extending from the erodable sensor module;
   the electrically resistive element including a major surface and a thin film pad disposed on the major surface oriented to be gradually worn away along an edge thereof in conformance to a wear profile for the brake lining;
   first and second electrically conductive rails in contact with the thin film pad and connected to the resistive lead and the ground lead, the first and second electrically conductive rails defining first and second sides of the thin film pad, respectively;
   the thin film pad of the electrically resistive element being thinner and exhibiting substantially greater unit resistivity than the first and second electrically conductive rails of the thin film pad; and
   a measurement circuit connected to the resistive lead for measuring the resistance of the thin film pad.

8. A brake lining wear and temperature measurement system according to claim 7, further comprising:
   the measurement circuit including a program providing means for determining if brakes for a vehicle are likely to be at ambient temperature and, responsive to an affirmative determination that the brakes are likely to be at ambient temperature, providing means responsive to a measurement of the resistance for equating the measured resistance to a degree of wear of the sensor; and
   the program stored on the measurement circuit further providing means responsive to determination that the brakes are likely to be at a temperature elevated compared to the ambient, using the measured resistance and the most recently obtained measurement of wear to determine brake lining temperature.

\* \* \* \* \*